Figure 1:
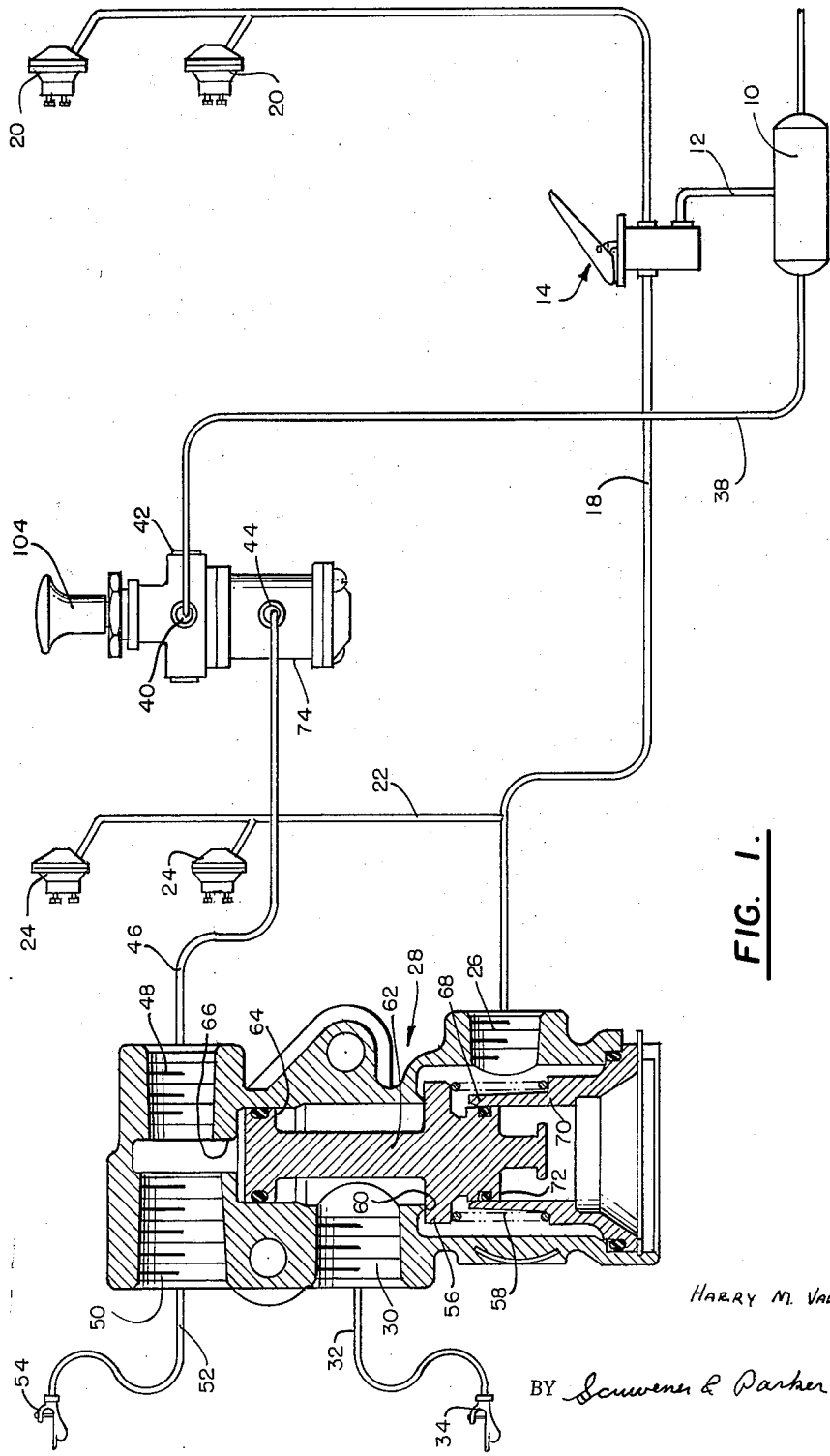

Sept. 17, 1963　　　H. M. VALENTINE　　　3,104,133
COMBINED CONTROL AND TRACTOR PROTECTION VALVE
Filed June 28, 1961　　　　　　　　　　2 Sheets-Sheet 1

INVENTOR
HARRY M. VALENTINE

BY Scrivener & Parker

ATTORNEYS

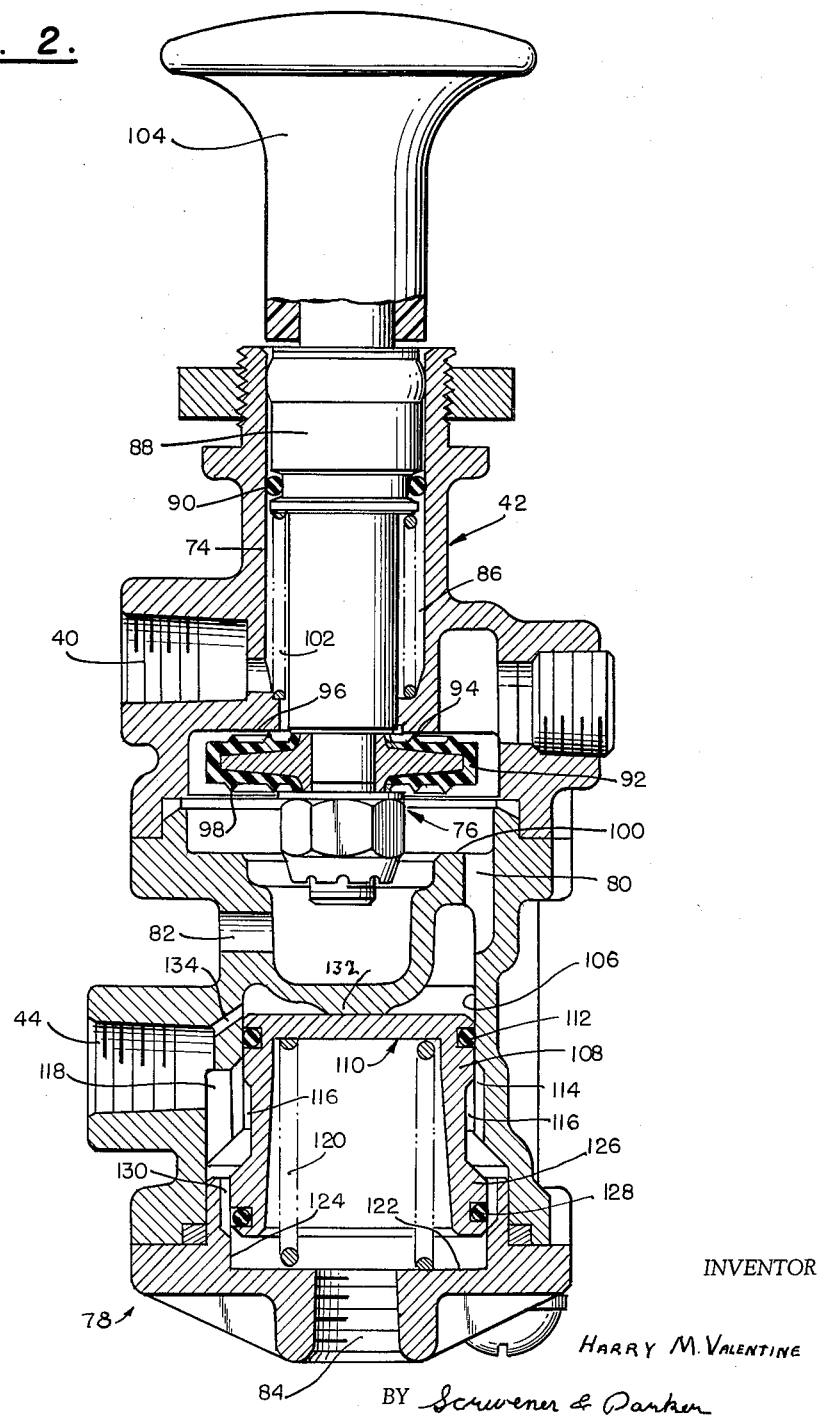

United States Patent Office 3,104,133
Patented Sept. 17, 1963

3,104,133
COMBINED CONTROL AND TRACTOR
PROTECTION VALVE
Harry M. Valentine, Elyria, Ohio, assignor to Bendix-Westinghouse Automotive Air Brake Company, Elyria, Ohio, a corporation of Delaware
Filed June 28, 1961, Ser. No. 120,229
10 Claims. (Cl. 303—50)

This invention relates to braking systems for use in tractor-trailer combinations and, more particularly, to an improved system, including a control valve therefor, for conserving air pressure on a tractor vehicle in the event of tractor-trailer break-in-two.

The present invention is concerned with braking systems of a well-known type having a service conduit, under the control of a manually operable brake-valve, and an emergency conduit which is normally charged with tractor reservoir pressure and so long as this pressure is above a predetermined safe value the emergency portion of a trailer relay-emergency valve is retained by this pressure in an inactivated position but whenever the pressure in the emergency conduit falls below the predetermined safe value, as might be caused for example, by tractor-trailer break-in-two, the emergency portion of the trailer relay emergency valve shifts automatically to its emergency position thereby directly connecting a trailer pressure reservoir with the trailer brakes so that these are automatically applied entirely independently of the brake valve carried on the tractor. To prevent the loss of pressure in the tractor system, particularly in the event of tractor-trailer break-in-two, substantially all connected vehicles carry on the tractor some sort of tractor protection valve means which is normally retained open by pressure in the tractor system which is above a predetermined safe value and this valve automatically moves to closed position to conserve sufficient pressure on the tractor for braking purposes whenever the pressure in the emergency conduit falls below the predetermined safe value.

In addition to a pressure responsive tractor protection valve, conventional fluid pressure brake systems also include a second manually operable valve which can be moved to a position for connecting the trailer emergency conduit to atmosphere while simultaneously disconnecting said conduit from the tractor system, thereby producing an automatic setting of the trailer brakes exactly as if the emergency conduit was broken, and it is an object of the present invention to provide an improved valve of the foregoing nature.

More particularly, it is an object of the present invention to provide a manually operable control valve which can be utilized to exhaust the trailer emergency conduit at the will of the operator while at the same time it closes off that portion of the emergency conduit carried on the tractor so as to conserve fluid pressure existing in the tractor system.

Another object of the invention is to provide a manually operable control valve which accomplishes the foregoing and yet is automatically responsive to the fall of pressure in the emergency conduit below a predetermined safe value so as to conserve pressure in the tractor system while simultaneously connecting the trailer emergency conduit to atmosphere.

It is yet another object of the invention to provide a valve which accomplishes the foregoing object yet is so constructed and arranged that when the pressure in the emergency conduit has fallen below a safe value, no amount of manual manipulation of the valve handle can prevent the automatic portion of the valve from moving to its emergency position nor, once the emergency portion has moved to its emergency position, can it be moved out of its emergency position by manipulation of the valve handle until such time as pressure in the tractor reservoir has been restored to a value above the predetermined safe value.

Still another object of the invention is to provide in a single casing manually operable valve means for controlling the flow of fluid pressure to and from the trailer emergency conduit and an automatically movable valve means which performs the function of a tractor protection valve to conserve fluid pressure on the tractor whenever this pressure falls below a predetermined safe value, the second valve means being movable only in response to fluid pressure and entirely independently of the manual movement of the first valve means.

Still another object of the invention is to provide control valve means of the foregoing nature wherein the manually operable valve portion is also responsive to the fall of pressure in the emergency conduit and is movable automatically to a position positively disconnecting the tractor system from the trailer emergency conduit.

Other objects and their attendant advantages will become apparent as the following description is read in conjunction with the accompanying drawings wherein:

FIG. 1 is a schematic view of a braking system for use with tractor-trailer combinations and incorporating the present invention; and FIG. 2 is an axial sectional view of a valve constructed in accordance with the present invention.

Referring to FIG. 1, a brake system arranged in accordance with the present invention is there illustrated as comprising a main tractor reservoir 10 which is connected by a conduit 12 to a conventional manually operated, self-lapping brake valve 14 having outlet service conduits 16, 18, the former of which leads to the forward brake actuators 20 of the tractor and the latter of which has connected thereto a branch conduit 22 leading to the rear brake actuators 24 of the tractor. The conduit 18 leads rearwardly of the tractor and is connected to an inlet port 26 of a tractor-carried, pressure responsive check valve means 28 having an outlet port 30 which has connected thereto a flexible conduit 32 carrying the usual "glad hand" 34 for connection to the corresponding member on the trailer (not shown).

Leading from the tractor reservoir is a second conduit 38 which is connected to the inlet port 40 of control valve means 42 constructed in accordance with the invention and hereinafter described in detail. The valve 42 has an outlet 44 to which there is connected one end of an emergency conduit 46 whose opposite end is connected to an inlet port 48 of the valve 28. The port 48 is in open communication with an outlet port 50 which has connected thereto an end of a flexible conduit 52 carrying at its opposite end a "glad hand" 54 adapted to be connected to the corresponding part of the trailer emergency conduit (not shown).

The valve 28 is of substantially conventional construction and includes a check valve element 56 which is normally urged by a spring 58 against a valve seat 60 to cut off communication between the inlet and outlet ports 26, 30. The check valve 56 has connected thereto a plunger 62 whose upper end carries a piston 64 having an upper surface which is exposed at all times through a port 66 with the pressure existing in the emergency conduit by way of aligned ports 48, 50. When the pressure in the emergency conduit is above a predetermined safe value of, say, 40 p.s.i., the upward force of the spring 58 is overcome by the pressure acting downwardly on the piston 64 so that the check valve 60 is moved from its normally closed position of FIG. 1 to a position wherein the lower side of the element 60 engages the upper annular edge 68 of a hollow part 70 thereby effecting a connection between the service ports 26, 30. In order that pressure in the service conduit will not thereafter retain valve element 60 in its open position independently of the pressure existing at the emergency ports 48, 50, a balancing piston 72 is provided to slide in hollow member 70. The diameters of pistons 64, 72 are equal so that pressures acting upwardly and downwardly on valve element 56 are equalized and can have no effect on the valve in its movement between its open and closed positions. It will, of course, be apparent that whenever the pressure in the emergency conduit falls below a safe value, the valve element 56 moves to its closed position to disconnect ports 26, 30 so that when the brake valve on the tractor is moved to its open position, service pressure admitted to conduit 18 cannot flow out of the trailer service line which might previously have been broken by tractor-trailer break-in-two.

Referring now to FIG. 2 which illustrates the control valve 42 of the present invention, it will be noted that said valve comprises a casing 74 containing the aforementioned inlet and outlet ports 40, 44. The connection between the ports 40, 44 is controlled by two valve elements 76, 78, which may be considered as separate serially arranged valves in the emergency conduit with the valves being communicated with each other by way of a port or passage 80 in the casing 74. The passage 80 is, in effect, an extension of the emergency conduit carried on the tractor and it is the purpose of the upper valve element 76 to connect passage 80 either to the inlet port 40 leading to the tractor reservoir or to an exhaust port 82. As will become fully apparent hereinafter, when valve 76 is moved to a position connecting port 80 with port 40, fluid pressure is admitted to the second valve member 78 by way of passage 80 and if this pressure is above the predetermined safe value, the valve 78 is moved by this pressure to a position connecting passage 80 with outlet port 44 and thereby admitting emergency pressure through the upper end of check valve 28 to the trailer relay-emergency valve to move and retain the emergency portion thereof to its inactive position in a manner well known in the art; at the same time, the service check valve element 56 of valve 28 is moved to open position as above explained.

When the valve member 76 is moved from the last mentioned position back to the position of FIG. 2, passage 80, and hence valve member 78 are connected to atmosphere through exhaust port 82 thereby causing valve member 78 to return to the position of the drawing and effect a connection between outlet port 44 and a second exhaust port 84 in the bottom of the casing 74. Upon this occurrence, pressure in the emergency conduit 46 is exhausted to atmosphere to cause the service check valve element 56 to move to its closed position of FIG. 1 while simultaneously the emergency portion of the trailer relay emergency valve moves to its emergency position to cause an automatic application of the trailer brakes.

Referring more particularly to the valve member 76 of the control valve 42, it will be observed that the casing 74 includes a bore 86 communicating with inlet port 40 and slidably receiving a valve plunger 88 having an O-ring seal 90. The lower end of the plunger 88 carries a valve element 92 of rubbery material having an inlet valve on its upper face and an exhaust valve on its lower face. The inlet valve is constituted by an annular bead 94 adapted to contact a face 96 of the casing 74 while the exhaust valve is formed by an annular bead 98 adapted to contact a face 100. A spring 102 is confined between a portion of the casing 74 and the plunger 88 and constantly tends to urge the plunger upwardly to maintain the inlet valve 94 closed. When closed, the area of the annular bead 94 is less than the area of the O-ring so that when the valve member 92 is in the closed or emergency position of FIG. 2, the valve will remain in such position even though the pressure at the inlet port 40 rises to full reservoir pressure. The valve may, however, be manually moved by means of a handle 104 from the position of FIG. 2 to a position wherein bead 98 engages face 100, in which event the valve element 92 will remain in such position provided the pressure acting on the upper side of the element 92 is above the minimum safe pressure of 40 p.s.i. This is due to the area of the exhaust valve bead 98 which is considerably larger than the bore 86. Hence, the valve element 92 is pressure responsive by reason of the pressure acting on the upper surface thereof over the area of the lower bead 98 to maintain the valve down against the force effective on the ring 90 and the force of the spring 102 until the fluid pressure at the inlet port 40 drops to or below the minimum safe value, whereupon the spring 102 moves the valve to the position of FIG. 2.

Referring now to the valve 78, this includes a bore or chamber 106 which slidably receives the upper end 108 of an inverted cup-shaped, piston-like valve element 110 having an O-ring 112 which, in the position of FIG. 2, serves to effect a seal between the upper side of the member 110, which is at all times in open communication with the aforementioned passage 80, and a series of vertical grooves 114 in the wall of bore 106. The grooves 114 serve to retain the O-ring 112 within its annular groove about the upper end of member 110 while simultaneously connecting the space above the member 110 to the outlet conduit 44 when the element 110 is moved by pressure from the position of FIG. 2 to a depressed position wherein the O-ring 112 is below the upper ends of the grooves 114 so that fluid pressure acting on member 110 can flow to outlet port 44 by of grooves 114 and an annular recessed portion 116 about the exterior of member 110, which recessed portion is at all times in communication with the outlet port 44 by way of an opening 118 in the casing 74 as shown.

The element 110 is normally retained in the position of FIG. 2 by means of a spring 120 interposed between an abutment 122 and the lower surface of the member 110 as shown.

The bore 106 has an enlarged lower part 124 which slidably receives an enlarged part 126 of the piston-like element 110, the enlarged part 126 having an O-ring 128 which is adapted to be slid past a series of vertical grooves 130 in the bore part 124, the grooves having a length such that when the element 110 is in the position of FIG. 2, the grooves communicate the space beneath element 110, which space is at all times in open communication with the aforementioned exhaust bore 84, with the outlet port 44 by way of annular recess 116 and opening 118. It will be understood that when element 110 is moved to its second position by pressure acting on the upper side thereof, the O-ring 128 will be first moved below the grooves 130 to disconnect the exhaust bore 84 from the outlet port 44 and immediately thereafter or simultaneously therewith the O-ring 112 will be moved below the upper end of the grooves 114 so as to connect the pressure in passage 80 with the outlet port 44. As pressure flows from passage 80 to port 44 it also acts downwardly on O-ring 128 which, being larger than O-ring 112, causes the element 110 to be moved fully into its second position with a snap action. After element 110 has been moved to its second position, it is retained in this position by pressure above the minimum safe value acting on the entire area of element 110 defined by the circumference of the larger O-ring 128 and the enlarged bore part 124. When the pressure in passage 80 falls below the minimum safe value of 40 p.s.i., spring 120 acts on element 110 to move it to the position of FIG. 2 where its upward movement is adapted to be limited by a stop member 132 integral with casing 74. As element 110 approaches its upper position, the O-ring 128 is first moved above the lower ends of groove 130 and immediately thereafter the O-ring 112 is moved above the upper ends of the grooves 114 so that element 110 moves fully into its position of FIG. 2 with a snap action. Upon this occurrence, passage 80 is disconnected from outlet port 44 while the latter is connected with the exhaust port 84. To positively insure against the possibility of both O-rings 112 and 128 partaking of a lap position wherein each is in sealing engagement with its respective bore part beyond the grooves thereof, a small bleed passage 134 is provided which at all times interconnects the space on the upper side of element 110 with the outlet port 44. This arrangement prevents the trapping of pressure in the emergency conduit downstream of outlet port 44 to the extent where an emergency brake application is long delayed, depending on the location and magnitude of a possible leak in the emergency conduit. The bleed hole 134 is of such size that it does not exceed the capacity of the vehicle's compressor (not shown) to build up the system pressure in the event the handle 104 of valve member 76 is held in manually during pressure build-up from a no air condition to a pressure above the predetermined safe value whereupon valve element 92 is retained by pressure in its depressed condition as previously mentioned.

In operation, assume a condition wherein the pressure in the main reservoir is substantially above the minimum safe value of 40 p.s.i. and assume further that the control valve of FIG. 2 and the checkvalve of FIG. 1 are in the positions illustrated. Under these circumstances, the emergency conduit 46 is connected with atmosphere by way of outlet port 44 and exhaust port 84 of valve 42 so that the trailer brakes are set and the tractor and trailer service conduits are disconnected from each other as a result of the closed condition of the service check valve element 56 of valve member 28. Should the operator now desire to release the trailer brakes, he merely pushes inwardly on the handle 104 of valve 42 to compress spring 102 while moving inlet valve bead 94 to its open position and exhaust valve bead 98 to its closed position. Because the pressure is assumed to be above the predetermined safe value, element 92 is retained in the second position by the pressure at inlet port 40. This pressure then flows by way of passage 80 to the upper end of bore 106 of the lower valve means 78 and acts on the upper surface of valve member 110 to move this downwardly against the upward force of spring 120 thereby connecting the pressure in passage 80 to the outlet port 44 by way of vertical grooves 114, recess 116 and opening 118, the pressure thus admitted to outlet port 44 flowing through emergency conduit 46 and the upper end of valve 28 to the trailer relay emergency valve so that this now moves to its inactive position thereby releasing the trailer brakes. The pressure in the emergency conduit also acts on piston 64 of valve member 28 to move the service checkvalve element 56 to its open position thereby interconnecting the tractor and trailer service systems so that all of the brakes on the connected vehicles may be service applied under control of the brake valve 14 on the tractor.

Assume now, that for some reason the operator desires an application of the trailer brakes independently of the tractor brakes, as might be desirable in parking the vehicles. Under these conditions, the operator merely pulls the valve handle 104 outwardly which has the effect of disconnecting inlet port 40 from passage 80 in valve casing 74 while simultaneously connecting passage 80 to exhaust port 82. Upon this occurrence, downwardly acting pressure on the top of element 110 of valve part 78 is immediately relieved and the spring 120 returns element 110 to the position of FIG. 2 thereby connecting the emergency conduit 46 to atmosphere by way of ports 44, 84 so that the emergency conduit is exhausted to effect an application of the trailer brakes as previously explained.

Assume now, that the operator is driving the vehicles and a slow leak takes place somewhere in the brake system so that the pressure in the tractor reservoir 10 falls below the safe value but this fact is unknown to the operator. As soon as the pressure reaches a level slightly less than 40 p.s.i., spring 102 of the manually controlled valve member 76 moves plunger 88 to the position of FIG. 2 thereby disconnecting port 40 from passage 80 while connecting the latter to atmosphere. Upon this occurrence, valve element 110 promptly moves to the position of FIG. 2 to effect an emergency application of the trailer brakes. Should, at this stage, the operator wish to release the trailer brakes even though he is aware that braking pressure is below a safe value, he may endeavor to effect such a release by pushing inwardly on the handle 104 of the valve member 76. He is, of course, capable of doing this and when this has been accomplished he can, by continued manual pressure, maintain the valve element 92 in its second position so as to connect tractor reservoir pressure with the upper surface of valve element 110 by way of port 40 and passage 80. However, because tractor reservoir pressure is below the safe value which is required to depress spring 120 acting on valve element 110, the latter remains in the position of FIG. 2 and the trailer brakes remain applied and no amount of manipulation of handle 104 will effect a release of the trailer brakes and these can only be released by restoration of tractor reservoir pressure to a level above the minimum safe value.

Assume again that the tractor-trailer combination is moving normally and that the trailer unexpectedly breaks away from the tractor thus breaking the service and emergency conduit at a point between the vehicles. Upon this occurrence, the trailer emergency conduit is, of course, immediately exhausted to atmosphere and the trailer brakes are automatically applied. Because that part of the emergency conduit carried on the tractor is also connected to atmosphere through the broken end of the conduit, the emergency conduit 46 is immediately exhausted though this has no immediate effect if it is assumed that tractor reservoir pressure was substantially above the predetermined safe level at the moment of break-in-two. So long as tractor reservoir pressure is above the safe value both valve 76 and valve 78 remain in their down position and pressure flows from the tractor reservoir through the port 40, passage 80, outlet port 44 through the broken emergency conduit to atmosphere and this flow continues until the pressure in the tractor reservoir has fallen to just below the minimum safe operating value whereupon manually controlled valve element 92 is moved automatically by its spring 102 to the position of FIG. 2 thereby immediately disconnecting the broken conduit from the tractor reservoir so that sufficient pressure is retained in the tractor reservoir to permit the tractor to be brought to a stop by a regular service application of the tractor brakes. Naturally, as soon as the manually operable valve element 92 had moved to the position of FIG. 2, the passage 80 was connected to atmosphere through exhaust port 82 and the valve element 110 of the valve part 78 moved to the position of FIG. 2 from whence it cannot be moved merely by the manual operation of the valve element 92. Thus, the operator is prevented from involuntarily connecting the tractor reservoir to atmosphere through the broken emergency conduit by unwittingly pushing inwardly on the handle 104.

In none of the foregoing examples can the operation of the valve device 78 be prevented by a balanced pressure condition acting on element 110 to retain this in a lap position. As previously explained, such action is obviated by the small bleed hole 134.

It should be apparent from the foregoing description, that the present invention has provided an improved combined trailer brake control valve and a tractor protection valve which positively prevents the loss of tractor braking pressure in the event of leakage or tractor trailer break-in-two. Furthermore, the valve of the invention affords means whereby the operator is prevented from overriding the automatic operation of the safety features of the invention. Though the valve of the invention has been described in connection with its use in a tractor-trailer braking system, it will be apparent that the valve has equal applicability in any fluid pressure system where it may be desirable to have both manual and non-overridable automatic control of the pressure in the system.

It will be apparent that the invention is susceptible of a variety of modifications and changes without, however, departing from the scope of the appended claims.

What is claimed is:

1. Fluid pressure control valve means comprising a casing having an inlet port connected at all times to a source of fluid pressure and an outlet port connected at all times to a pressure actuated device, first and second valve chambers in said casing respectively connected to said inlet and outlet ports, a pair of independently movable valve elements each respectively occupying one of said chambers, a pair of exhaust ports each connected respectively to one of said chambers, passage means interconnecting said chambers, manual means for moving said first valve element between a first position wherein said inlet port is disconnected from said passage means and the latter is connected to said first exhaust port and a second position wherein said inlet port is connected to said passage means and the latter is disconnected from said exhaust port, and means responsive to the pressure in said passage means for effecting movement of said second valve element between a first position wherein said passage means is disconnected from said outlet port and the latter is connected to said second exhaust port and a second position wherein said passage means is connected to said outlet port and the latter is disconnected from said second exhaust port.

2. The fluid pressure control valve means of claim 1 wherein resilient means normally urge each of said valve elements towards its first position.

3. The fluid pressure control valve means of claim 2 including fluid pressure responsive means for retaining said first valve element in its second position against said resilient means so long as the pressure at said inlet port is above a predetermined value.

4. The fluid pressure control valve means of claim 2 wherein said resilient means acting on said second valve element retains said element in its first position until the pressure in said passage means is above a predetermined value.

5. Fluid pressure control valve means comprising a casing having inlet and outlet ports respectively connected to a source of fluid pressure and to a fluid pressure receiver, manually operable valve means in said casing movable between first and second positions for permitting or preventing the flow of fluid pressure from said inlet port towards said outlet port, means independent of said manually operable valve means for preventing the flow of fluid pressure from said inlet port to said outlet port unless said pressure at said inlet port is above a predetermined value, said last named means comprising second valve means in said casing between said inlet and outlet ports, resilient means urging said second valve means to a position preventing the flow of fluid pressure from said inlet to said outlet port, fluid pressure responsive means responsive to pressure above said predetermined value for moving said second valve means to a position connecting said inlet and outlet ports when said manually movable valve means is moved to its second position, and means for subjecting said fluid pressure responsive means to the pressure at said inlet port only when said manually operable valve means is moved to its second position.

6. The fluid pressure control valve means of claim 5 including an exhaust port in said casing controlled by said second valve means, said valve means including means connecting said exhaust port to said outlet port when said valve means is in its first position and disconnecting said outlet port from said exhaust port when said valve means is in its second position.

7. The fluid pressure control valve means of claim 5 including an exhaust port in said casing controlled by said manually operable valve means, means connecting said exhaust port and said pressure responsive means when said manually operable valve means is in its first position, and means disconnecting said pressure responsive means from said exhaust port when said manually operable valve means is in its second position.

8. The fluid pressure control valve means of claim 5 including a bleed passage at all times connecting said outlet port with said fluid pressure responsive means.

9. The fluid pressure control valve means of claim 5 including a pair of exhaust ports in said casing, means for connecting or disconnecting said outlet port to one of said exhaust ports depending upon whether said second valve means is in its first or second position, and means for connecting or disconnecting said pressure responsive means to said second exhaust port depending upon whether said manually operable valve means is in its first or second position.

10. The fluid pressure control valve means of claim 9 wherein said fluid pressure responsive means is integral with said second valve means and includes a pair of differential areas, one of which is alternatively connectable to said outlet port or said first exhaust port and the other of which is alternatively connectable to said inlet port or said second exhaust port depending upon whether said valve means are in their first or second positions.

References Cited in the file of this patent
UNITED STATES PATENTS

| | | |
|---|---|---|
| 2,645,308 | Fitch et al. | July 14, 1953 |
| 2,923,576 | Seale | Feb. 2, 1960 |